United States Patent
Hsu et al.

(10) Patent No.: US 9,521,246 B2
(45) Date of Patent: Dec. 13, 2016

(54) THERMAL CONTROL METHOD AND THERMAL CONTROL SYSTEM

(71) Applicant: MEDIATEK INC., Hsin-Chu (TW)

(72) Inventors: Jih-Ming Hsu, Taoyuan (TW); Wei-Ting Wang, Taipei (TW); Wen-Tsan Hsieh, Hsinchu (TW); Tai-Yu Chen, Taipei (TW); Chia-Feng Yeh, New Taipei (TW); Chien-Tse Fang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 11 days.

(21) Appl. No.: 14/670,418

(22) Filed: Mar. 27, 2015

(65) Prior Publication Data
US 2015/0350407 A1 Dec. 3, 2015

Related U.S. Application Data

(63) Continuation-in-part of application No. 14/294,170, filed on Jun. 3, 2014.

(51) Int. Cl.
*H04M 1/725* (2006.01)
*G06F 1/20* (2006.01)

(52) U.S. Cl.
CPC .......... *H04M 1/72569* (2013.01); *G06F 1/206* (2013.01); *H04M 1/72525* (2013.01); *H04M 1/72577* (2013.01)

(58) Field of Classification Search
CPC ...................... H04M 1/72569; H04M 1/72577; H04M 1/72525
See application file for complete search history.

(56) References Cited

U.S. PATENT DOCUMENTS

| | | | |
|---|---|---|---|
| 8,462,560 B2 * | 6/2013 | Furutani | G11C 8/06 365/189.05 |
| 2006/0193157 A1 * | 8/2006 | Ma | H02M 3/156 363/123 |
| 2006/0221527 A1 * | 10/2006 | Jacobson | G01K 7/42 361/100 |
| 2008/0114967 A1 * | 5/2008 | Saen | G06F 1/3228 712/221 |
| 2009/0290625 A1 * | 11/2009 | Riddle | G06F 1/206 375/222 |
| 2013/0076381 A1 * | 3/2013 | Takayanagi | G01K 3/005 324/750.03 |
| 2013/0205151 A1 * | 8/2013 | Hsiao | G06F 1/3234 713/323 |
| 2015/0208557 A1 * | 7/2015 | Porto | H05K 7/20945 307/117 |

(Continued)

*Primary Examiner* — Bobbak Safaipour
(74) *Attorney, Agent, or Firm* — Winston Hsu; Scott Margo

(57) ABSTRACT

The invention provides a thermal control method and a thermal control system. The thermal control method comprises: detecting a temperature variance of a component of the electronic device to generate a detecting result; and determining a temperature threshold value for the integrated circuit as a throttling point according to the detecting result. The thermal control system comprises: a detecting unit, for detecting a temperature variance of a component of the electronic device to generate a detecting result; and a determining unit, for determining a temperature threshold value for the integrated circuit as a throttling point according to the detecting result.

23 Claims, 15 Drawing Sheets

(56) References Cited

U.S. PATENT DOCUMENTS

2016/0003688 A1\* 1/2016 Luber ............... G01K 15/007
    361/103
2016/0092616 A1\* 3/2016 Coutts ............... G06F 17/5009
    703/2

\* cited by examiner

THERMAL CONTROL METHOD AND THERMAL CONTROL SYSTEM

CROSS REFERENCE TO RELATED APPLICATIONS

This CIP application claims the benefit of co-pending U.S. patent application Ser. No. 14/294,170, filed on Jun. 3, 2014 and included herein by reference.

BACKGROUND OF THE INVENTION

The disclosed embodiments of the invention relate to a thermal control method and a thermal control system, and more particularly, to a thermal control method and a thermal control system which can better fit environmental changes and have a better dynamic thermal management.

Please refer to FIG. 1. FIG. 1 is a timing diagram illustrating a conventional thermal control method for a cellphone. As shown in FIG. 1, the conventional thermal control method only detects a current temperature of an SoC of the cellphone, and when the temperature of the SoC attains 90° C. (i.e. a throttling point), the conventional thermal control method starts to throttle (i.e. lower the CPU frequency). Thus, the throttling process happens fast and the throttling degree is big in the conventional thermal control method. For example, the full-speed time of the cellphone in FIG. 1 is only 17 seconds, and the conventional thermal control method starts to throttle after 17 seconds.

SUMMARY OF THE INVENTION

In accordance with exemplary embodiments of the invention, a thermal control method and a thermal control system are proposed to solve the above-mentioned problem.

According to an aspect of the invention, an exemplary thermal control method for an integrated circuit in an electronic device is disclosed. The thermal control method comprises: continuously detecting a current temperature value of a component of the electronic device to generate a first detecting result; determining a current temperature threshold value for the integrated circuit according to the first detecting result and a first function; and gradually adjusting the current temperature threshold value according to the detected current temperature value of the component to reach a target temperature threshold value for the integrated circuit.

According to an aspect of the invention, an exemplary thermal control system for an integrated circuit in an electronic device is disclosed. The thermal control system comprises: a first detecting unit and a determining unit. The first detecting unit is utilized for continuously detecting a current temperature value of a component of the electronic device to generate a first detecting result. The determining unit is coupled to the first detecting unit, and utilized for determining a current temperature threshold value for the integrated circuit according to the first detecting result and a first function, and gradually adjusting the current temperature threshold value according to the detected current temperature value of the component to reach a target temperature threshold value for the integrated circuit.

Briefly summarized, the thermal control method and the thermal control system disclosed by the invention can provide a better user experience for smooth application performance, and the invention can better fit environmental changes and have a better dynamic thermal management.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
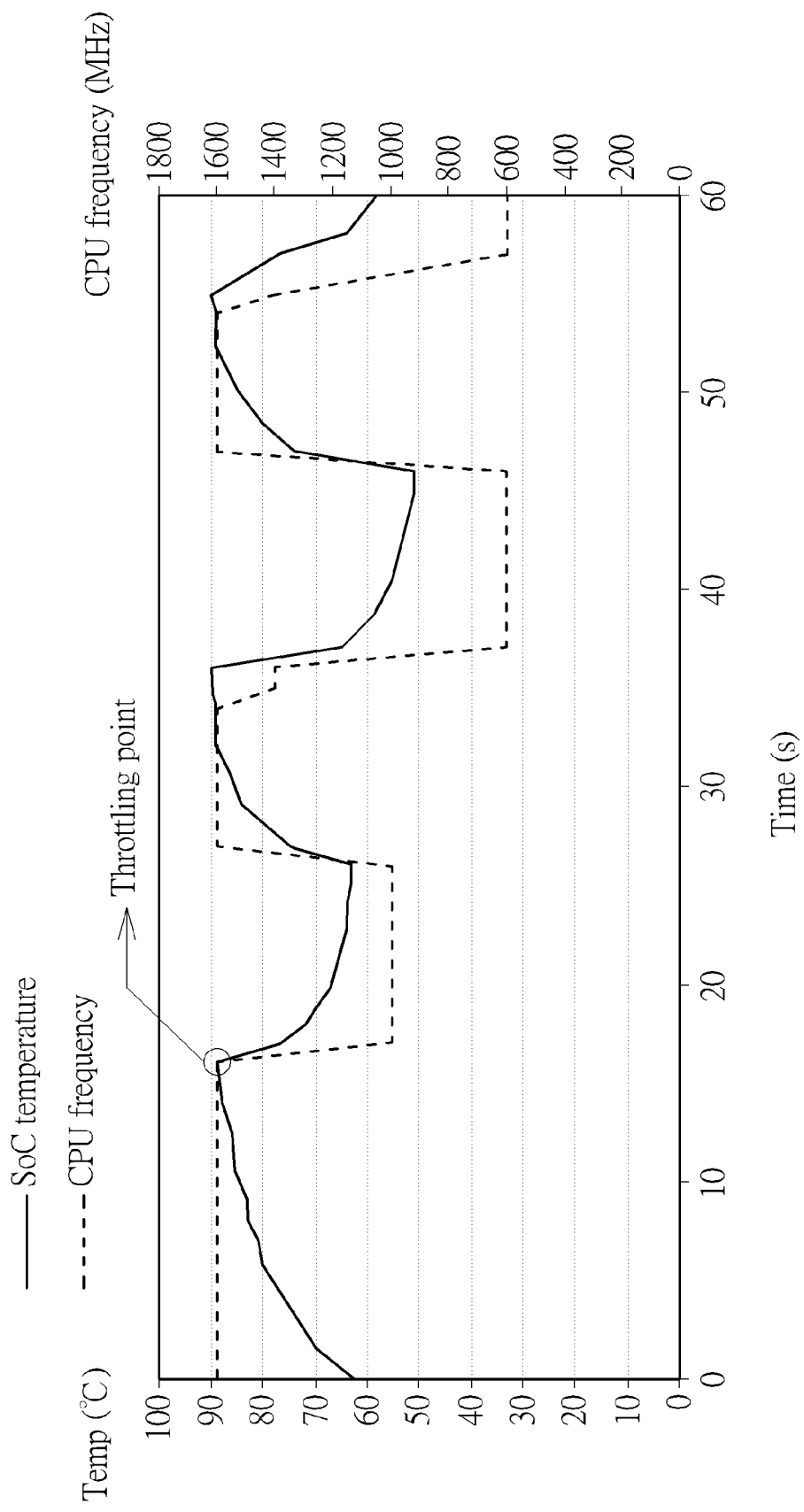
FIG. 1 is a timing diagram illustrating a conventional thermal control method for a cellphone.
Figure 2:
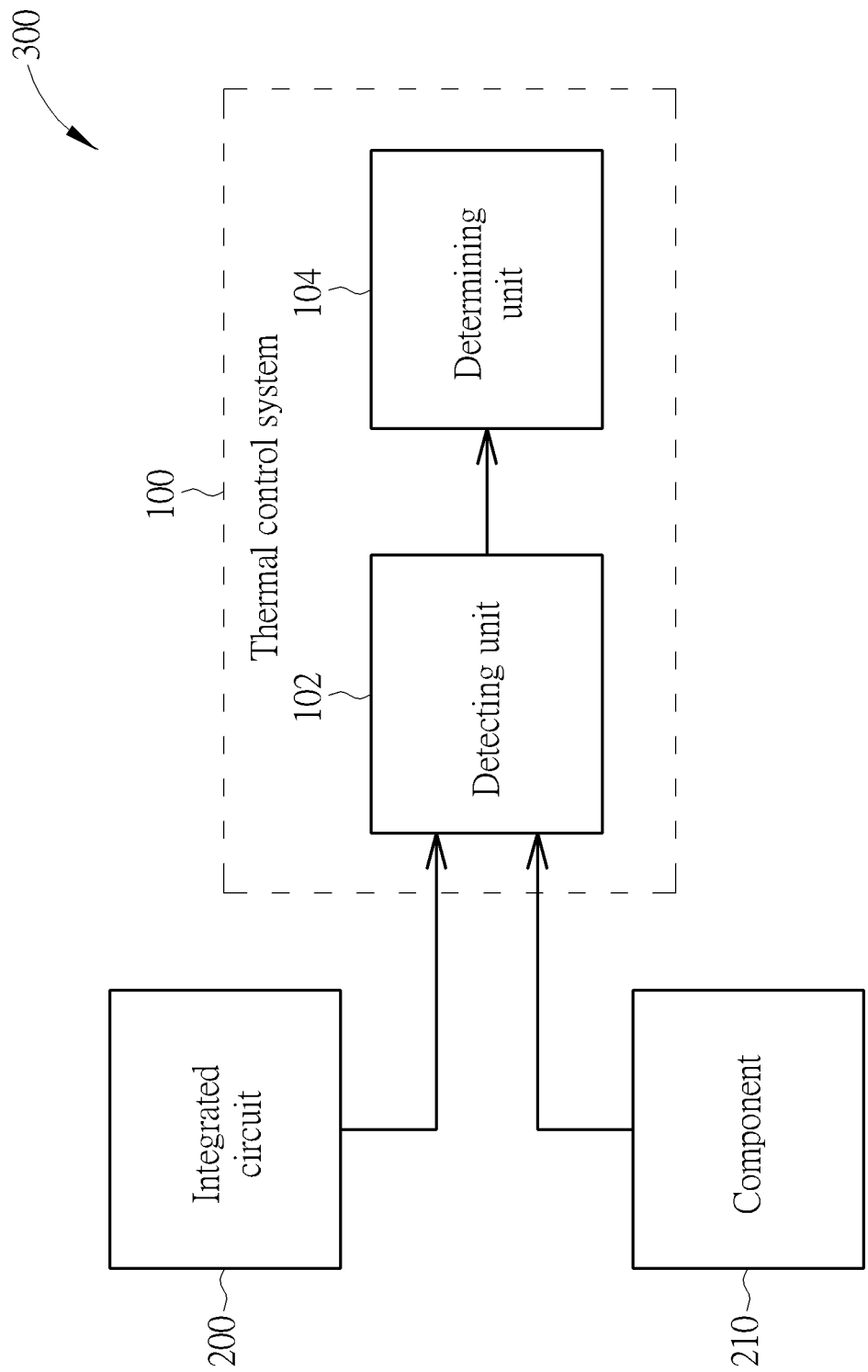
FIG. 2 is a simplified diagram of a thermal control system for an integrated circuit in an electronic device according to a first embodiment of the invention.

Please refer to FIG. 2. FIG. 2 is a simplified diagram of a thermal control system 100 for an integrated circuit 200 in an electronic device 300 according to a first embodiment of the invention, wherein the electronic device 300 can be a cellphone, and the integrated circuit 200 can be a system on chip (SoC) of the cellphone. As shown in FIG. 2, the thermal control system 100 comprises: a detecting unit 102 and a determining unit 104. The detecting unit 102 is utilized for detecting a temperature variance of a component 210 of the electronic device 300 to generate a detecting result, wherein the component 210 can be a printed circuit board (PCB) of the cellphone.

The first detecting unit is utilized for continuously detecting a current temperature value of a component of the electronic device to generate a first detecting result. The determining unit is coupled to the first detecting unit, and utilized for determining a current temperature threshold value for the integrated circuit according to the first detecting result and a first function, and gradually adjusting the current temperature threshold value according to the detected current temperature value of the component to reach a target temperature threshold value for the integrated circuit.

The function of the detecting unit 102 of detecting the temperature variance of the component 210 of the electronic device 300 to generate the detecting result comprises: detecting a current temperature value of the component 210; determining an initial temperature value of the component 210; and comparing the current temperature value with the initial temperature value of the component 210 to generate the detecting result.

The function of determining the initial temperature value of the component 210 comprises: comparing the detected current temperature value with a first temperature threshold value; if the detected current temperature value is higher than the first temperature threshold value, then utilizing the first temperature threshold value as the initial temperature value of the component 210; and if the detected current temperature value is lower than the first temperature threshold value, then utilizing a power value of the integrated circuit 200, a package thermal resistance coefficient, and an ambient temperature value to calculate the initial temperature value of the component 210. The first temperature threshold value is corresponding to a predetermined temperature threshold value of a housing of the electronic device 300 (i.e. the skin of the electronic device 300).

The determining unit 104 is coupled to detecting unit 102, and utilized for determining a temperature threshold value for the integrated circuit 200 as a throttling point according to the detecting result.

The function of determining the temperature threshold value for the integrated circuit 200 according to the detecting result comprises: if the detecting result shows the temperature variance is lower than a predetermined temperature value, then utilizing a predetermined temperature threshold value as the temperature threshold value for the integrated circuit 200; and if the detecting result shows the temperature variance is not lower than a predetermined temperature value, then determining a second temperature threshold value as the temperature threshold value for the integrated circuit 200, wherein the second temperature threshold value is lower than the predetermined temperature threshold value.

The function of determining the second temperature threshold value comprises: calculating a difference between the second temperature threshold value and a temperature variance of the integrated circuit 200 corresponding to the temperature variance of the component 210 to generate a calculating result; comparing the calculating result with the first temperature threshold value; if the calculating result is higher than the first temperature threshold value, then utilizing the calculating result as the second temperature threshold value; and if the calculating result is not higher than the first temperature threshold value, then utilizing the first temperature threshold value as the second temperature threshold value.

For example, the detecting unit 102 detects a current temperature value of the component 210. Next, the detecting unit 102 compares the detected current temperature value with a first temperature threshold value of 70° C., wherein the first temperature threshold value is corresponding to a predetermined temperature threshold value of 50° C. of a housing of the electronic device 300 (i.e. the skin of the electronic device 300). If the detected current temperature value is 75° C., which is higher than the first temperature threshold value of 70° C., then the first temperature threshold value of 70° C. will be utilized as the initial temperature value of the component 210. Please note that the above embodiment is only for an illustrative purpose and is not meant to be a limitation of the invention. For example, the first temperature threshold value can be changed according to different cellphones.

If the detected current temperature value is 55° C., which is lower than the first temperature threshold value of 70° C., then a power value of the integrated circuit 200, a package thermal resistance coefficient, and an ambient temperature value will be utilized to calculate the initial temperature value of the component 210. For example, the initial temperature value can be calculated by multiplying the power value of the integrated circuit 200 with the package thermal resistance coefficient and adding the ambient temperature value (for example, 25° C.) to be 50° C. Please note that the above embodiment is only for an illustrative purpose and is not meant to be a limitation of the invention. For example, the ambient temperature value can be changed according to different conditions, and the initial temperature value will be changed accordingly.

Next, the detecting unit 102 compares the current temperature value with the initial temperature value of the component 210 to generate the detecting result, and the determining unit 104 determines a temperature threshold value for the integrated circuit 200 as a throttling point according to the detecting result.

For example, if the current temperature value of the component 210 is 75° C. and the initial temperature value of the component 210 is 70° C., and a predetermined temperature value is 10° C., then the detecting result shows the temperature variance of the component 210 is 5° C., which is lower than the predetermined temperature value of 10° C., and thus a predetermined temperature threshold value of 90° C. will be utilized as the temperature threshold value (i.e. the throttling point) for the integrated circuit 200. Please note that the above embodiment is only for an illustrative purpose and is not meant to be a limitation of the invention. For example, the predetermined temperature value can be changed according to different design requirements.

If the current temperature value of the component 210 is 85° C. and the initial temperature value of the component 210 is 70° C., and the predetermined temperature value is 10° C., then the detecting result shows the temperature variance of the component 210 is 15° C., which is not lower than the predetermined temperature value of 10° C., and thus a second temperature threshold value will be determined as the temperature threshold value for the integrated circuit 200.

The function of determining the second temperature threshold value comprises: calculating a difference between the predetermined temperature threshold value and a temperature variance of the integrated circuit 200 corresponding to the temperature variance of the component 210 to generate a calculating result; comparing the calculating result with the first temperature threshold value of 70° C.; if the calculating result is higher than the first temperature threshold value of 70° C., then utilizing the calculating result as the second temperature threshold value; and if the calculating result is not higher than the first temperature threshold value of 70° C., then utilizing the first temperature threshold value of 70° C. as the second temperature threshold value. The temperature variance of the integrated circuit 200 is generated by multiplying a cellphone parameter with the temperature variance of the component 210.

For example, if the predetermined temperature threshold value is 90° C., the cellphone parameter is 1, the current temperature value of the component 210 is 85° C. and the initial temperature value of the component 210 is 70° C. (i.e. the temperature variance of the component 210 is 15° C.), then the calculating process is 90° C.−(85° C.−70° C.)*1, and the calculating result is 75° C., which is higher than the first temperature threshold value of 70° C., and thus the calculating result of 75° C. is utilized as the second temperature threshold value.

If the predetermined temperature threshold value is 90° C., the cellphone parameter is 2, the current temperature value of the component 210 is 85° C. and the initial temperature value of the component 210 is 70° C. (i.e. the temperature variance of the component 210 is 15° C.), then the calculating process is 90° C.−(85° C.−70° C.)*2, and the calculating result is 60° C., which is not higher than the first temperature threshold value of 70° C., and thus the first temperature threshold value of 70° C. is utilized as the second temperature threshold value.

In other words, assume the temperature threshold value for the integrated circuit 200 to be Tj_limit, the current temperature value of the component 210 to be T_PCB_now, the initial temperature value of the component 210 to be T_PCB_ini, the predetermined temperature value to be T_pcb_hot, the predetermined temperature threshold value to be Tj_high, the second temperature threshold value to be Tj_low, and the above thermal control process of the thermal control system 100 can be summarized by the below algorithm:
If (T_PCB_now−T_PCB_ini)<T_pcb_hot
Then Tj_limit=Tj_high
Else Tj_limit=Tj_low=Max(Tj_high−(T_PCB_now−T_PCB_ini)*A;
Tj_lowbound)

Figure 3:
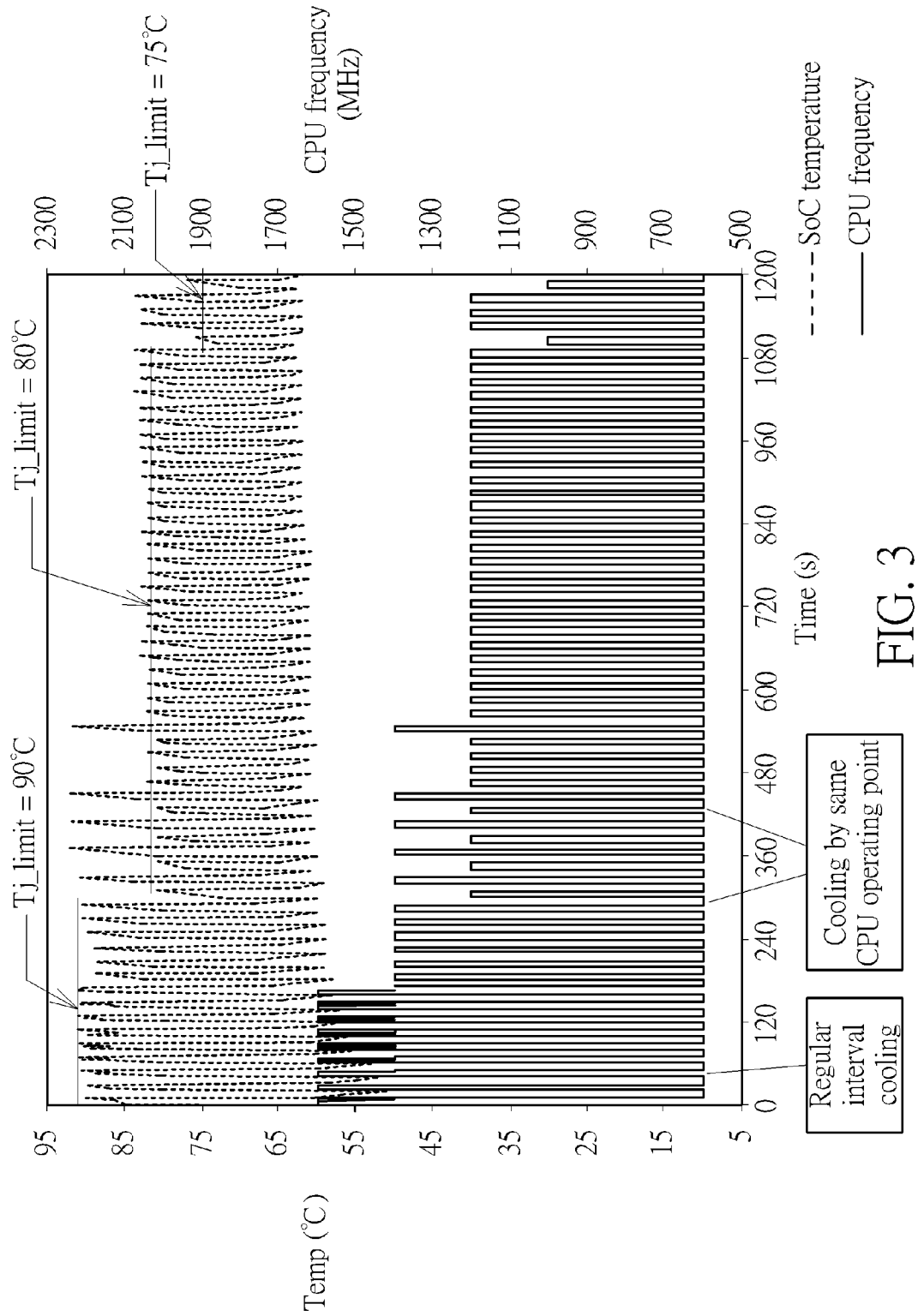
FIG. 3 is a timing diagram illustrating an exemplary embodiment of the thermal control process performed by the thermal control system in FIG. 2.

Please refer to FIG. 3. FIG. 3 is a timing diagram illustrating an exemplary embodiment of the above thermal control process. As shown in FIG. 3, a better CPU performance without too hot in the skin of the electronic device 300 can be achieved, and the invention can better fit environmental changes and have a better dynamic thermal management. For example, the full-speed time of the cellphone in FIG. 3 is about 300 seconds, and the thermal control method in the invention starts to throttle after 300 seconds. In addition, the thermal control method in the invention does not only detect the current temperature of the SoC of the cellphone, and does not perform the dynamic thermal management only according to the current temperature of the SoC of the cellphone. Instead, the invention consider the current temperature of the SoC of the cellphone, the temperature variance of the PCB of the cellphone, and the ambient temperature when performing the dynamic thermal management. Thus, the invention can better fit environmental changes and have a better dynamic thermal management.

Figure 4:
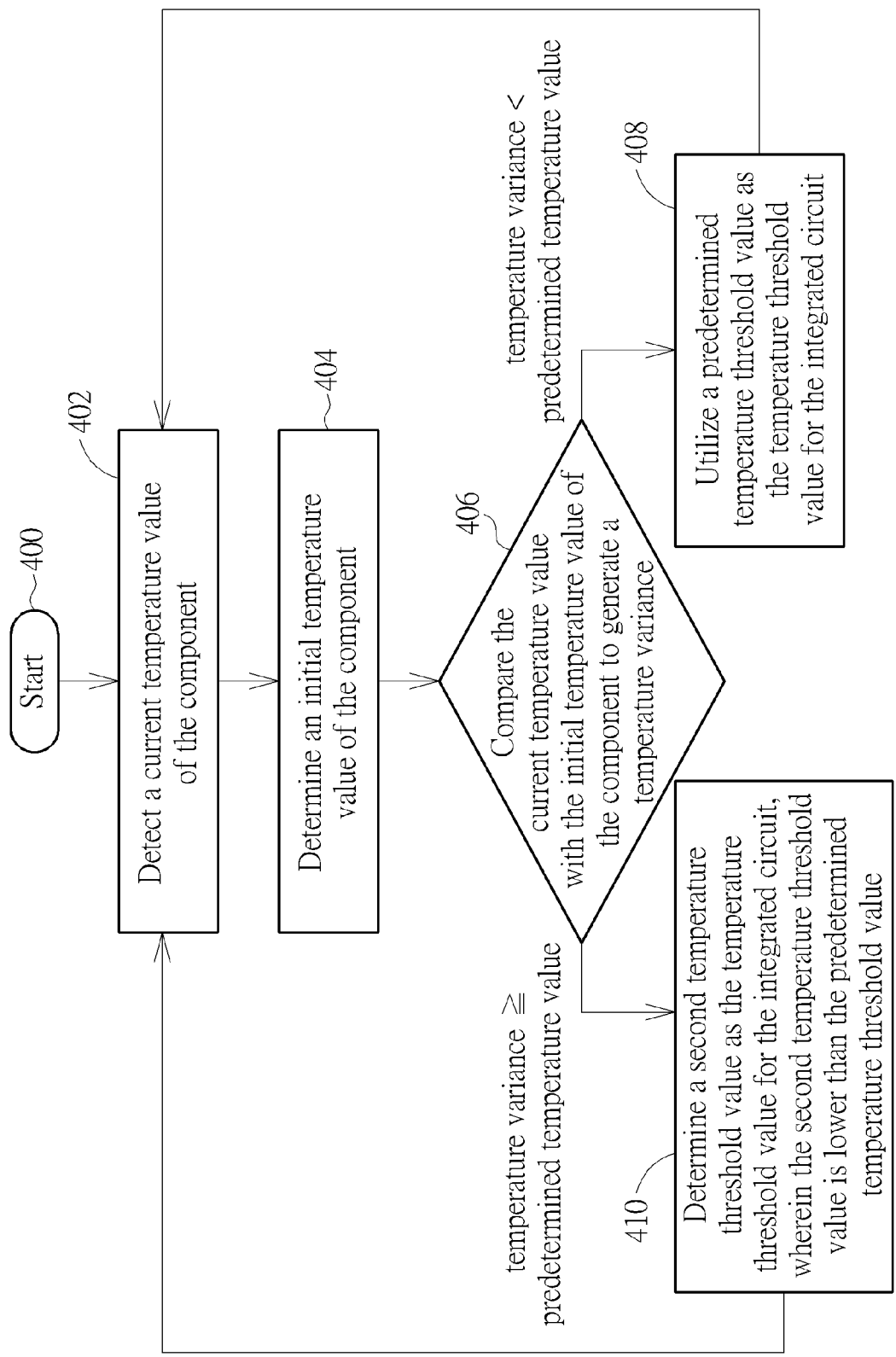
FIG. 4 is a flowchart showing a thermal control method in accordance with the operation schemes of the thermal control system in FIG. 2.

Please refer to FIG. 4. FIG. 4 is a flowchart showing a thermal control method in accordance with the operation schemes of the thermal control system 100 in the above embodiment. Provided that the result is substantially the same, the steps in FIG. 4 are not required to be executed in the exact order shown in FIG. 4. The thermal control method in accordance with the above embodiment of the thermal control system 100 in the invention comprises the following steps:

Step 400: Start.
Step 402: Detect a current temperature value of the component.
Step 404: Determine an initial temperature value of the component.
Step 406: Compare the current temperature value with the initial temperature value of the component to generate a temperature variance; if the temperature variance is lower than a predetermined temperature value, then go to Step 408; and if the temperature variance is not lower than the predetermined temperature value, then go to Step 410.
Step 408: Utilize a predetermined temperature threshold value as the temperature threshold value for the integrated circuit.
Step 410: Determine a second temperature threshold value as the temperature threshold value for the integrated circuit, wherein the second temperature threshold value is lower than the predetermined temperature threshold value.

In addition, the step 404 of determining the initial temperature value of the component comprises: comparing the detected current temperature value with a first temperature threshold value; if the detected current temperature value is higher than the first temperature threshold value, then utilizing the first temperature threshold value as the initial temperature value of the component; and if the detected current temperature value is lower than the first temperature threshold value, then utilizing a power value of the integrated circuit, a package thermal resistance coefficient, and an ambient temperature value to calculate the initial temperature value of the component.

The step 410 of determining the second temperature threshold value comprises: calculating a difference between the predetermined temperature threshold value and a temperature variance of the integrated circuit corresponding to the temperature variance of the component to generate a calculating result; comparing the calculating result with the first temperature threshold value; if the calculating result is higher than the first temperature threshold value, then utilizing the calculating result as the second temperature threshold value; and if the calculating result is not higher than the first temperature threshold value, then utilizing the first temperature threshold value as the second temperature threshold value.

Figure 5:
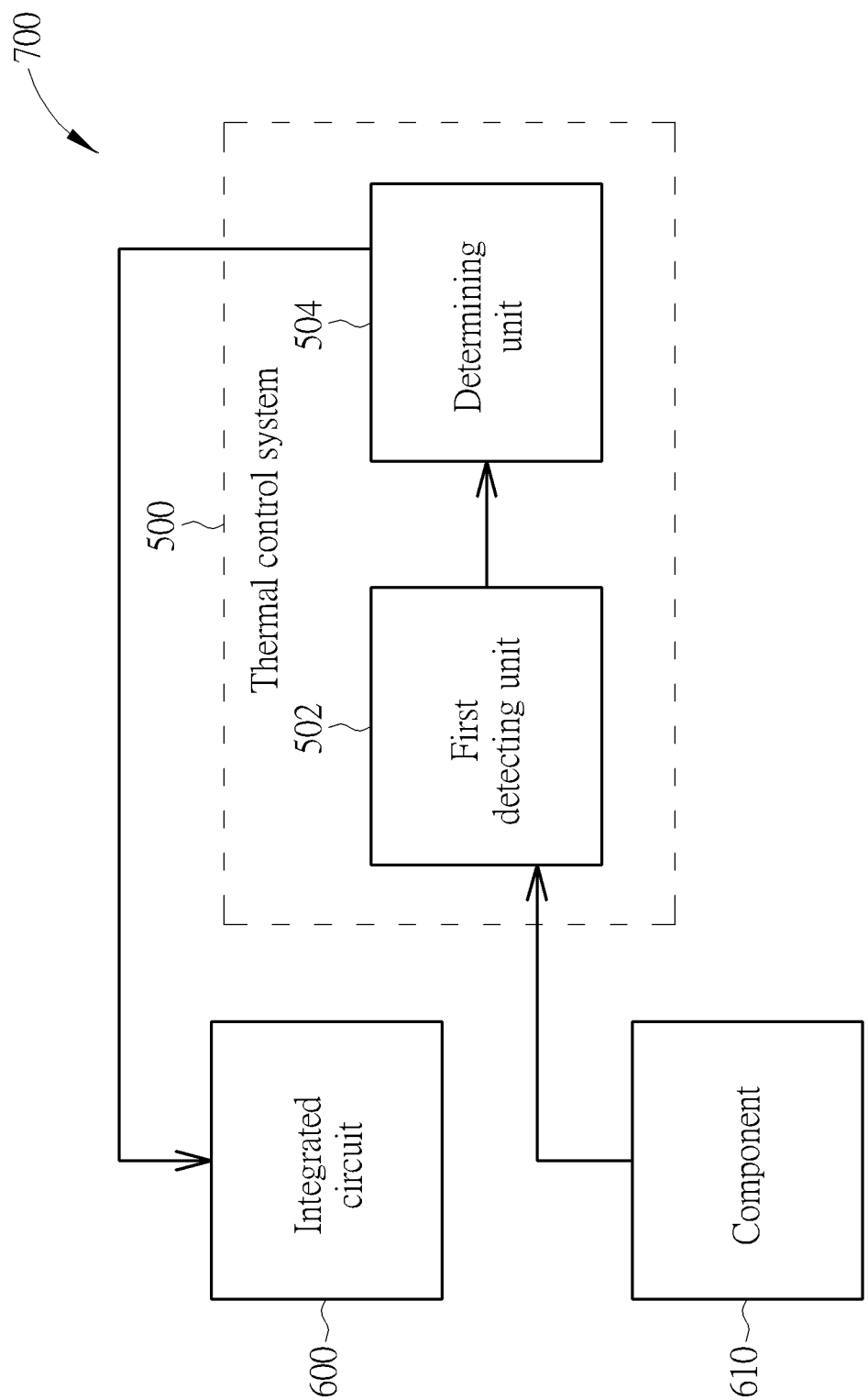
FIG. 5 is a simplified diagram of a thermal control system for an integrated circuit in an electronic device according to a second embodiment of the invention.

FIG. 5 is a simplified diagram of a thermal control system 500 for an integrated circuit 600 in an electronic device 700 according to a second embodiment of the invention. The electronic device 700 can be a cellphone, and the integrated circuit 600 can be a system on chip (SoC) of the cellphone. The thermal control system 500 comprises a first detecting unit 502 and a determining unit 504, wherein the determining unit 504 can be disposed in the integrated circuit 600. The first detecting unit 502 is utilized for continuously detecting a current temperature value of a component 610 of the electronic device 700 to generate a first detecting result, wherein the component 610 can be a printed circuit board (PCB) of the cellphone. Please note that the above embodiment is only for an illustrative purpose and is not meant to be a limitation of the invention. For example, the electronic device 700 can be any kind of mobile device, and the component 610 can be a skin or a housing of the electronic device 700, and the integrated circuit 600 may comprise a CPU, a GPU, a DSP, or an MCU.

The determining unit 504 is coupled to the first detecting unit 502, and utilized for determining a current temperature threshold value for the integrated circuit 600 according to the first detecting result and a first function, and gradually adjusting the current temperature threshold value according to the detected current temperature value of the component 610 to reach a target temperature threshold value for the integrated circuit 600, wherein the first function can be a continuous function. In addition, the determining unit 504 can further comprise a function of loading a firmware comprising parameters of the first function.

Figure 6:
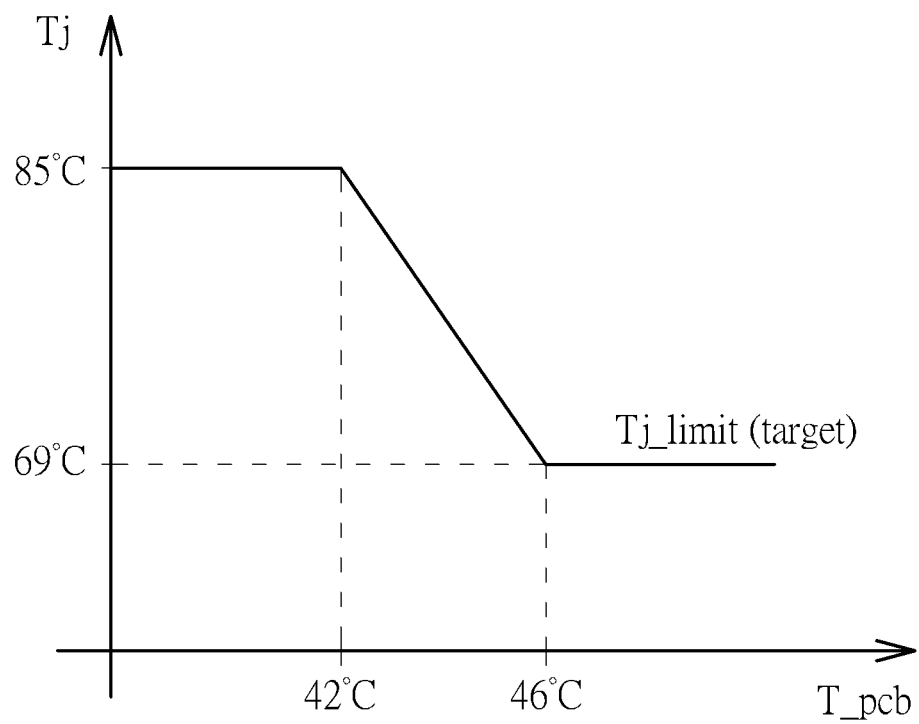
FIG. 6 is a diagram illustrating a first exemplary embodiment of the thermal control process performed by the thermal control system in FIG. 5.
Figure 7:
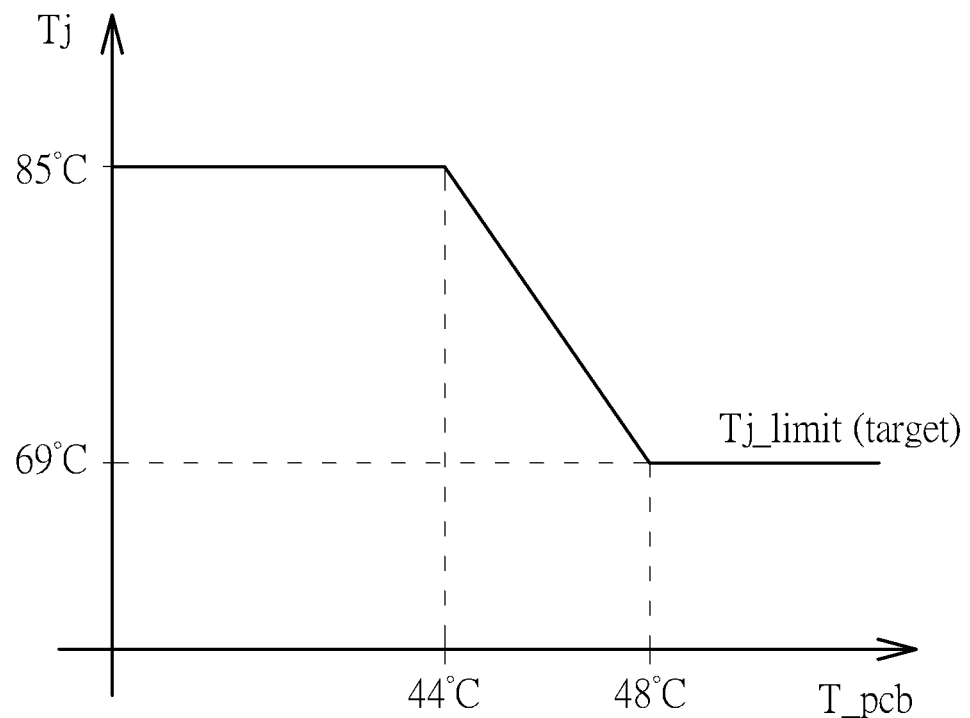
FIG. 7 is a diagram illustrating a second exemplary embodiment of the thermal control process performed by the thermal control system in FIG. 5.
Figure 8:
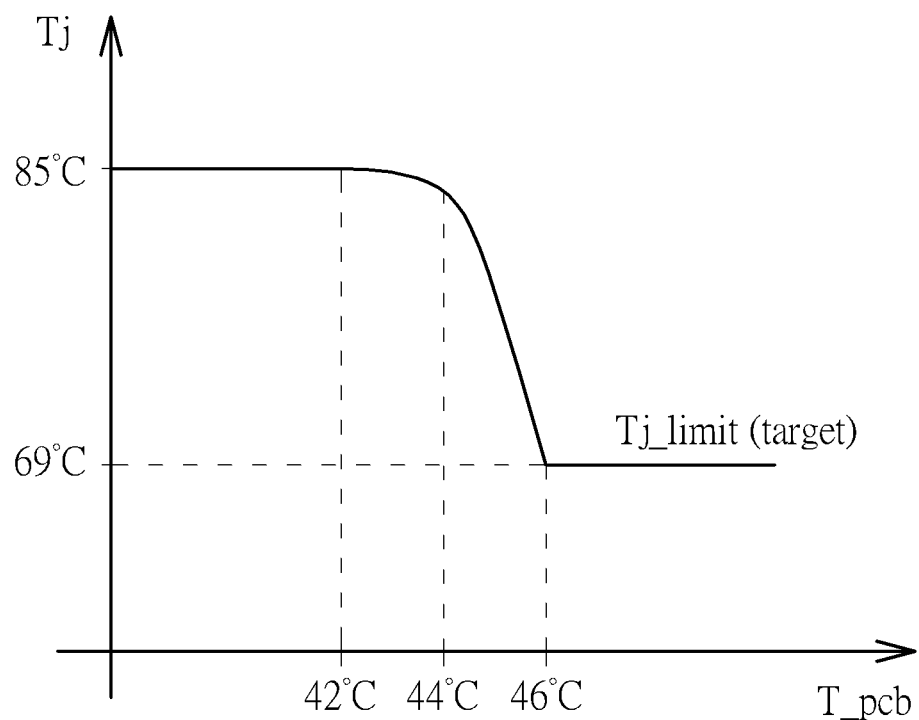
FIG. 8 is a diagram illustrating a third exemplary embodiment of the thermal control process performed by the thermal control system in FIG. 5.

FIG. 6 is a diagram illustrating a first embodiment of the above thermal control process. The first detecting unit 502 detects a current temperature value of the component 610 of the electronic device 700 to generate a first detecting result. For example, if the detected current temperature value T_pcb of the component 610 is 42.1° C., which is higher than a first temperature threshold value of 42° C. of the component 610, then the determining unit 504 determines a current temperature threshold value Tj_limit of 84.6° C. for the integrated circuit 600 according to the above detecting result and the first function. Next, if the detected current temperature value T_pcb of the component 610 is 42.2° C., which is higher than a first temperature threshold value of 42° C. of the component 610, then the determining unit 504 determining a current temperature threshold value Tj_limit of 84.2° C. for the integrated circuit 600 according to the above detecting result and the first function. That is, the determining unit 504 gradually adjusts the current temperature threshold value according to the detected current temperature value of the component 610 to reach a target temperature threshold value Tj_limit of 69° C. for the integrated circuit 600 when the detected current temperature value T_pcb of the component 610 is 46° C., which is equal to a second temperature threshold value of 46° C. of the component 610, as shown in FIG. 6. Please note that the above embodiment is only for an illustrative purpose and is not meant to be a limitation of the invention. For example, the first temperature threshold value and the second temperature threshold value of the component 610 can be changed according to different design requirements, and the slope or the parameters of the first function also can be changed according to different design requirements. For example, please refer to FIG. 7. FIG. 7 is a diagram illustrating a second embodiment of the above thermal control process. As shown in FIG. 7, the first temperature threshold value of the component 610 is increased to 44° C. and the second temperature threshold value of the component 610 is increased to 48° C. since the smoother thermal control can enlarge the thermal limit of the component 610. In addition, the second embodiment of the invention in FIG. 7 has a larger performance gain than that of the first embodiment of the invention in FIG. 6. In addition, please refer to FIG. 8. FIG. 8 is a diagram illustrating a third embodiment of the above thermal control process. As shown in FIG. 8, the parameters of the first function are changed to make the first function become a curve from a straight line.

Compared with the embodiment shown in FIG. 3, the temperature threshold values Tj_limit of different turbo modes in these embodiments are continuous. In other words, the current temperature threshold value is gradually adjusted according to the detected current temperature value of the component to reach a target temperature threshold value for the integrated circuit. The thermal control method and the thermal control system disclosed in these embodiments of the invention can provide a better user experience for smooth application performance since the temperature threshold value Tj_limit is not changed greatly in a second.

Figure 9:
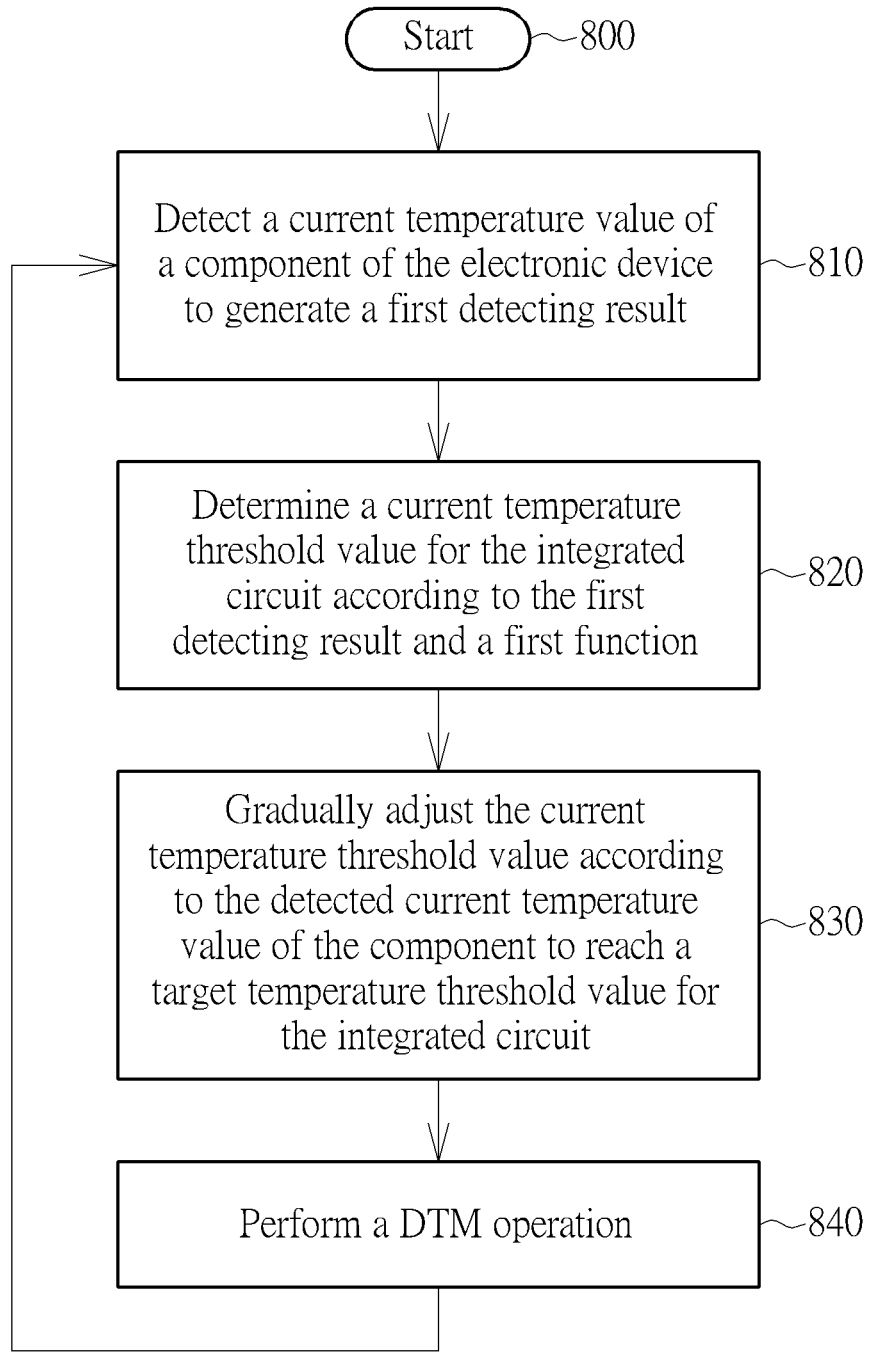
FIG. 9 is a flowchart showing a thermal control method in accordance with the operation schemes of the thermal control system in FIG. 5.

Please refer to FIG. 9. FIG. 9 is a flowchart showing a thermal control method in accordance with the operation schemes of the thermal control system 500 of the second embodiment in FIG. 9. Provided that the result is substantially the same, the steps in FIG. 9 are not required to be executed in the exact order shown in FIG. 9. The thermal control method in accordance with the above embodiment of the thermal control system 500 in the invention comprises the following steps:

Step 800: Start.

Step 810: Detect a current temperature value of a component of the electronic device to generate a first detecting result.

Step 820: Determine a current temperature threshold value for the integrated circuit according to the first detecting result and a first function, e.g. a continuous function.

Step 830: Gradually adjust the current temperature threshold value according to the detected current temperature value of the component to reach a target temperature threshold value for the integrated circuit.

Step 840: Perform a dynamic thermal management (DTM) operation.

In addition, the above thermal control method can further comprise a step of loading a firmware comprising parameters of the first function before performing the Step 810.

Figure 10:
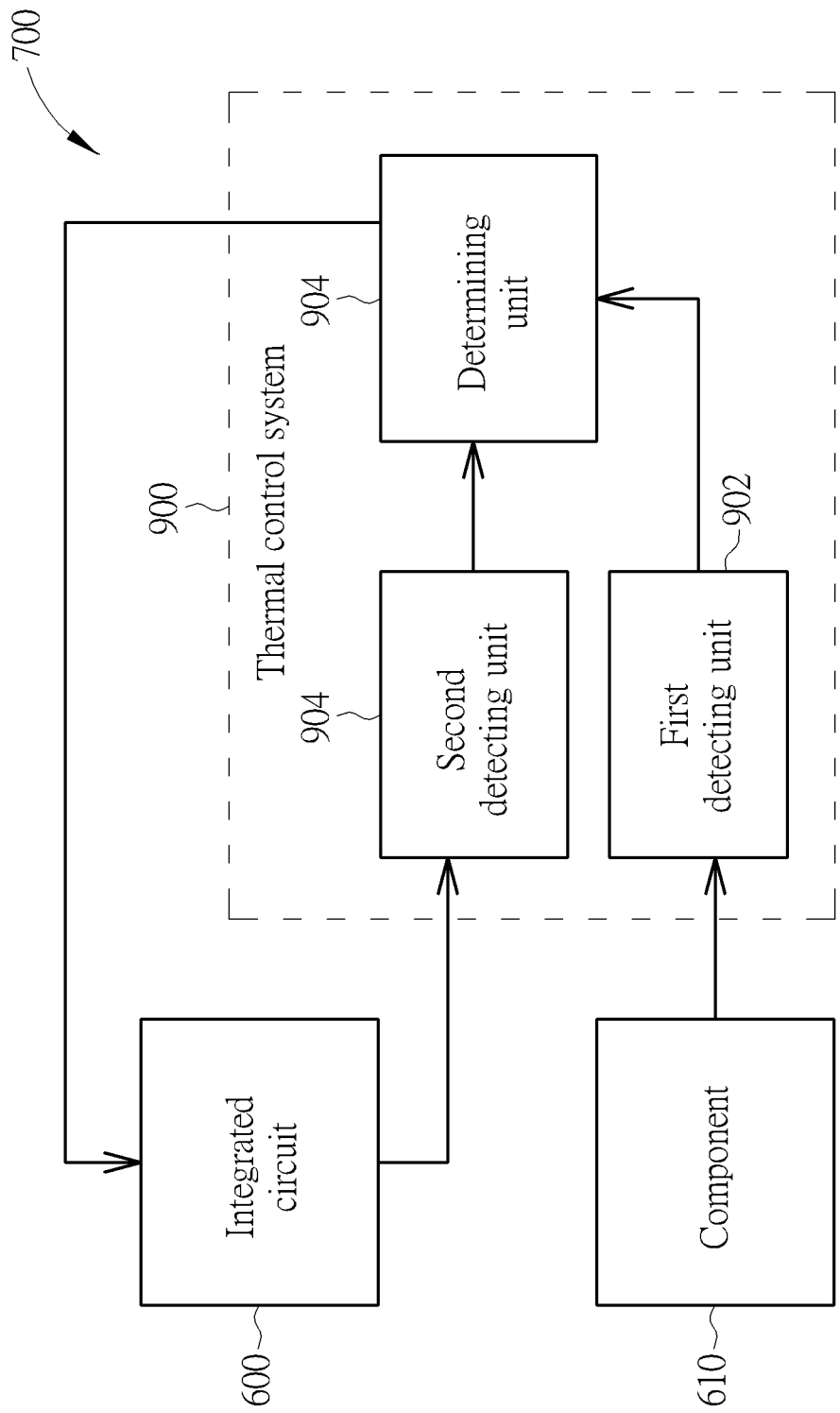
FIG. 10 is a simplified diagram of a thermal control system for an integrated circuit in an electronic device according to a third embodiment of the invention.

FIG. 10 is a simplified diagram of a thermal control system 900 for the integrated circuit 600 in the electronic device 700 according to a third embodiment of the invention, wherein the electronic device 700 can be a cellphone, and the integrated circuit 600 can be a system on chip (SoC) of the cellphone. The thermal control system 900 comprises a first detecting unit 902, a second detecting unit 904, and a determining unit 906, wherein the determining unit 906 can be disposed in the integrated circuit 600. The first detecting unit 902 is utilized for detecting a current temperature value of a component 610 of the electronic device 700 to generate a first detecting result, wherein the component 610 can be a printed circuit board (PCB) of the cellphone. The second detecting unit 904 is utilized for continuously detecting a current temperature value of the integrated circuit 600 to generate a second detecting result. Please note that the above embodiment is only for an illustrative purpose and is not meant to be a limitation of the invention. For example, the electronic device 700 can be any kind of mobile device, and the component 610 can be a skin or a housing of the electronic device 700, and the integrated circuit 600 may comprise a CPU, a GPU, a DSP, or an MCU. In addition, the second detecting unit 904 can be integrated in the integrated circuit 600 in another embodiment.

The determining unit 904 is coupled to the first detecting unit 902, and utilized for determining a current temperature threshold value for the integrated circuit 600 according to the first detecting result and a first function, and gradually adjusting the current temperature threshold value according to the detected current temperature value of the component 610 to reach a target temperature threshold value for the integrated circuit 600, wherein the first function can be a continuous function.

The determining unit 906 further determines whether to enter/exit a dynamic thermal management (DTM) operation according to the first detecting result and the second detecting result, wherein the function of the determining unit 906 of determining whether to enter/exit the DTM operation according to the detecting result comprises: determining a DTM temperature threshold value according to the first detecting result and a second function; comparing the current temperature of the integrated circuit 600 with the DTM temperature threshold value; if the current temperature of the integrated circuit 600 is higher than the DTM temperature threshold value, then entering the DTM operation; and if the calculating result is not higher than the DTM temperature threshold value, then exiting the DTM operation, wherein the second function can be a continuous function In addition, the determining unit 906 can further comprise a function of loading a firmware comprising parameters of the first function and the second function, wherein the first function and the second function can be continuous functions.

Figure 11:
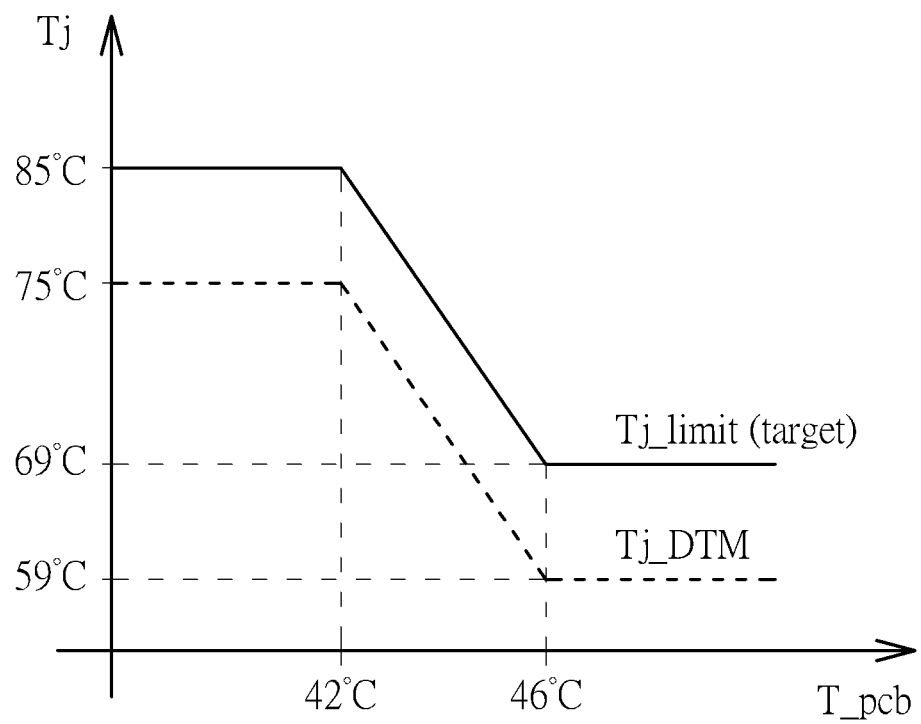
FIG. 11 is a diagram illustrating a first exemplary embodiment of the thermal control process performed by the thermal control system in FIG. 10.

FIG. 11 is a diagram illustrating a fourth embodiment of the above thermal control process. The first detecting unit 902 detects a current temperature value of the component 610 of the electronic device 700 to generate a first detecting result, and the second detecting unit 904 detects a current temperature value of the integrated circuit 600 to generate a second detecting result.

If the detected current temperature value T_pcb of the component 610 is 42.1° C., which is higher than a first temperature threshold value of 42° C. of the component 610, then the determining unit 504 determines a current temperature threshold value Tj_limit of 84.6° C. for the integrated circuit 600 according to the above detecting result and the first function, and determines a DTM temperature threshold value Tj_DTM of 74.6° C. according to the above detecting result and a second function. Next, the determining unit 504 compares the current temperature of the integrated circuit 600 with the DTM temperature threshold value Tj_DTM of 74.6° C., and if the current temperature Tj of the integrated circuit 600 is 75.6° C., which is higher than the DTM temperature threshold value Tj_DTM of 74.6° C., then entering the DTM operation; and if the current temperature of the integrated circuit 600 is not higher than the DTM temperature threshold value Tj_DTM of 74.6° C., then exiting the DTM operation, wherein the second function can be a continuous function.

Next, if the detected current temperature value T_pcb of the component 610 is 42.2° C., which is higher than a first temperature threshold value of 42° C. of the component 610, then the determining unit 504 determines a current temperature threshold value Tj_limit of 84.2° C. for the integrated circuit 600 according to the above detecting result and the first function, and determines a DTM temperature threshold value Tj_DTM of 74.2° C. according to the above detecting result and a second function. Next, the determining unit 504 compares the current temperature of the integrated circuit 600 with the DTM temperature threshold value Tj_DTM of 74.2° C., and if the current temperature Tj of the integrated circuit 600 is 75.2° C., which is higher than the DTM temperature threshold value Tj_DTM of 74.2° C., then entering the DTM operation; and if the current temperature Tj of the integrated circuit 600 is not higher than the DTM temperature threshold value Tj_DTM of 74.2° C., then exiting the DTM operation, wherein the second function can be a continuous function.

Figure 12:
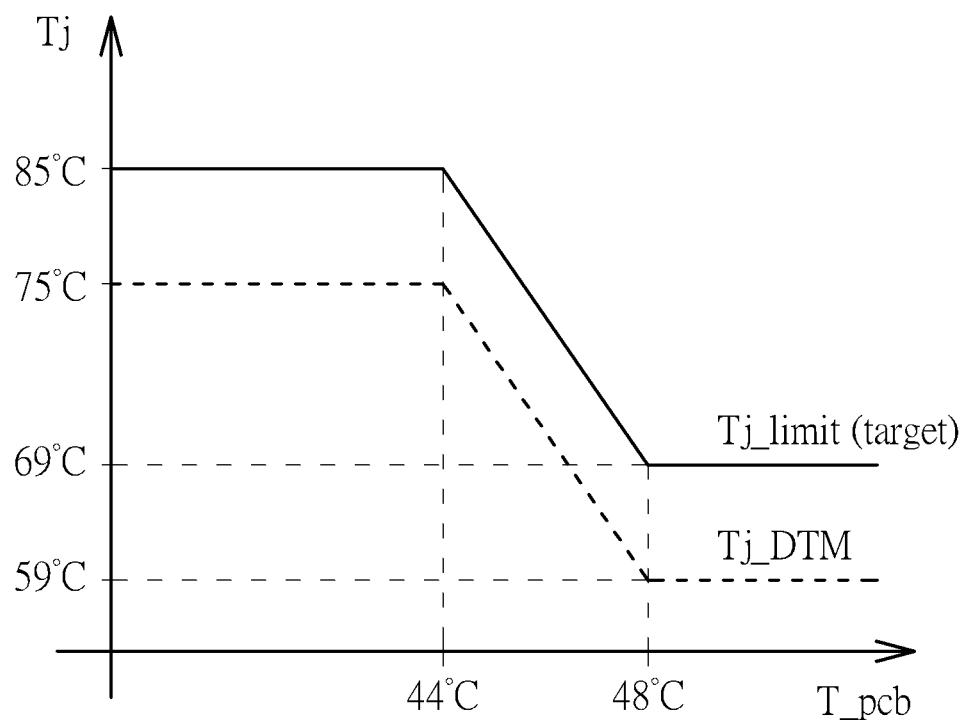
FIG. 12 is a diagram illustrating a second exemplary embodiment of the thermal control process performed by the thermal control system in FIG. 10.
Figure 13:
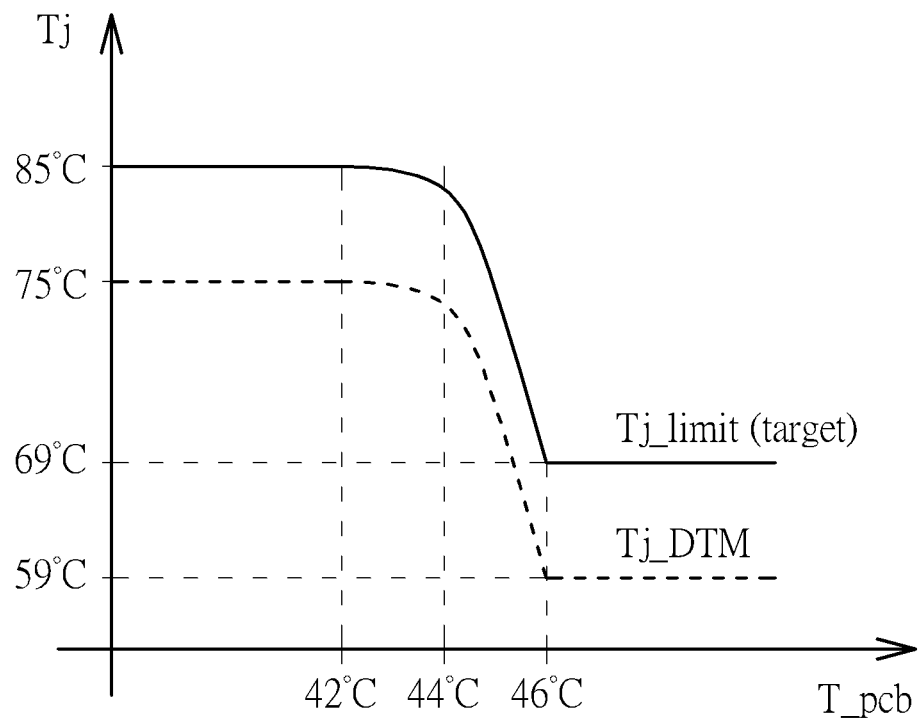
FIG. 13 is a diagram illustrating a third exemplary embodiment of the thermal control process performed by the thermal control system in FIG. 10.

That is, the determining unit 504 gradually adjusts the current temperature threshold value according to the detected current temperature value of the component 610 to reach a target temperature threshold value Tj_limit of 69° C. for the integrated circuit 600 when the detected current temperature value of the component 610 is 46° C., which is equal to a second temperature threshold value of 46° C. of the component 610, as shown in FIG. 11. Please note that the above embodiment is only for an illustrative purpose and is not meant to be a limitation of the invention. For example, the first temperature threshold value and the second temperature threshold value of the component 610 can be changed according to different design requirements, and the slope or the parameters of the first function also can be changed according to different design requirements. For example, please refer to FIG. 12. FIG. 12 is a diagram illustrating a fifth embodiment of the above thermal control process. As shown in FIG. 13, the first temperature threshold value of the component 610 is increased to 44° C. and the second temperature threshold value of the component 610 is increased to 48° C. since the smoother thermal control can enlarge the thermal limit of the component 610. In addition, the fifth embodiment of the invention in FIG. 12 has a larger performance gain than that of the fourth embodiment of the invention in FIG. 11. In addition, please refer to FIG. 13. FIG. 13 is a diagram illustrating a sixth embodiment of the above thermal control process. As shown in FIG. 13, the parameters of the first function are changed to make the first function become a curve from a straight line.

Compared with the embodiment shown in FIG. 3, the temperature threshold values Tj_limit of different turbo modes in these embodiments are continuous. In other words, the current temperature threshold value is gradually adjusted according to the detected current temperature value of the component to reach a target temperature threshold value for the integrated circuit. The thermal control method and the thermal control system disclosed in these embodiments of the invention can provide a better user experience for smooth application performance since the temperature threshold value Tj_limit is not changed greatly in a second.

Figure 14:
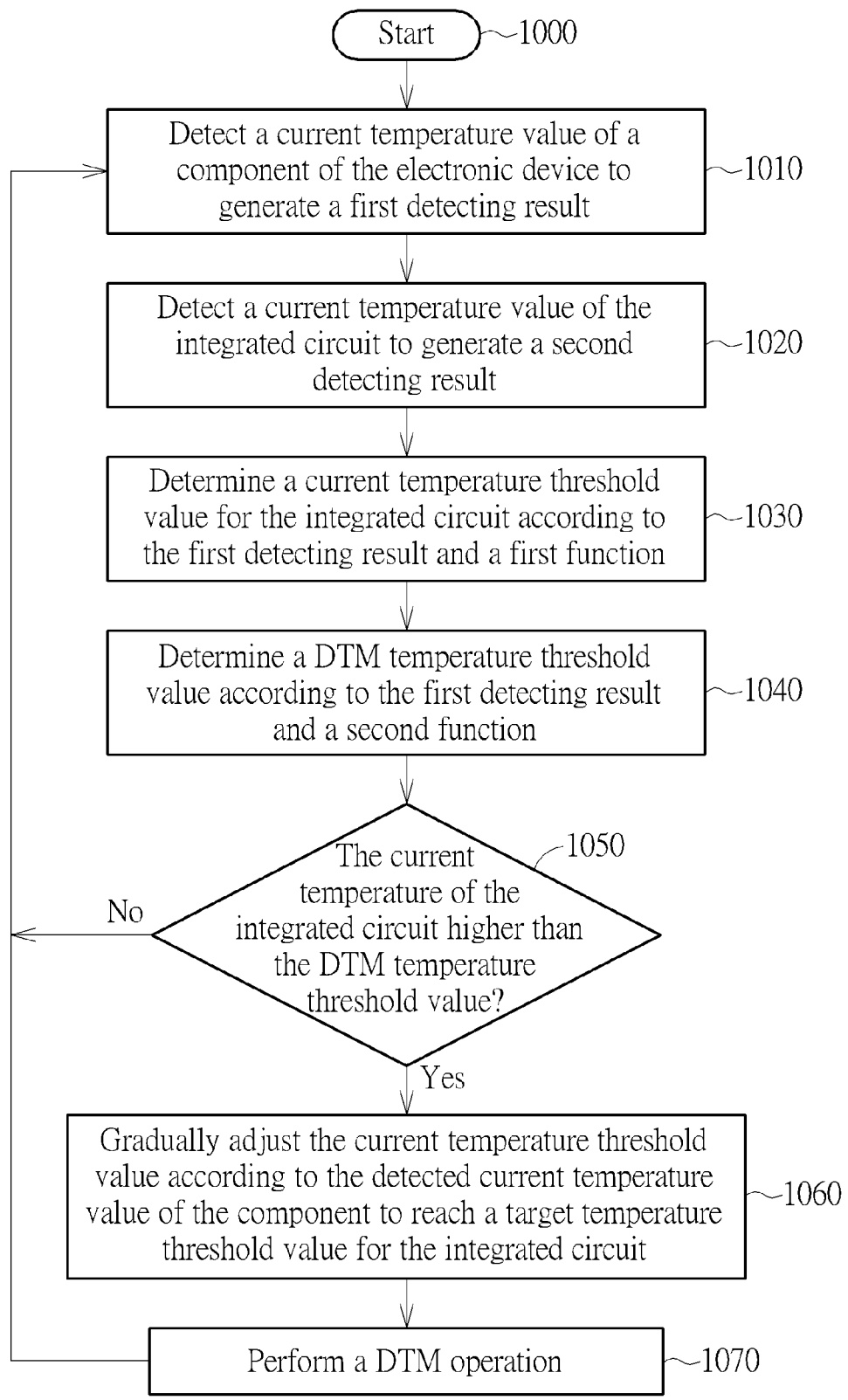
FIG. 14 is a flowchart showing a thermal control method in accordance with the operation schemes of the thermal control system in FIG. 10.

FIG. 14 is a flowchart showing a thermal control method in accordance with the operation schemes of the thermal control system 900 of the third embodiment in FIG. 10. Provided that the result is substantially the same, the steps in FIG. 14 are not required to be executed in the exact order shown in FIG. 14. The thermal control method in accordance with the above embodiment of the thermal control system 900 in the invention comprises the following steps:

Step 1000: Start.

Step 1010: Detect a current temperature value of a component of the electronic device to generate a first detecting result.

Step 1020: Detect a current temperature value of the integrated circuit to generate a second detecting result.

Step 1030: Determine a current temperature threshold value for the integrated circuit according to the first detecting result and a first function.

Step 1040: Determine a DTM temperature threshold value according to the first detecting result and a second function.

Step 1050: Compare the current temperature of the integrated circuit with the DTM temperature threshold value; if the current temperature of the integrated circuit is higher than the DTM temperature threshold value, then go to the Step 1060; and if the current temperature of the integrated circuit is not higher than the DTM temperature threshold value, then go to the Step 1010 (or exit a DTM operation).

Step 1060: Gradually adjust the current temperature threshold value according to the detected current temperature value of the component to reach a target temperature threshold value for the integrated circuit.

Step 1070: Perform a DTM operation.

In addition, the above thermal control method can further comprise a step of loading a firmware comprising parameters of the first function and the second function before performing the Step 1010.

Figure 15:
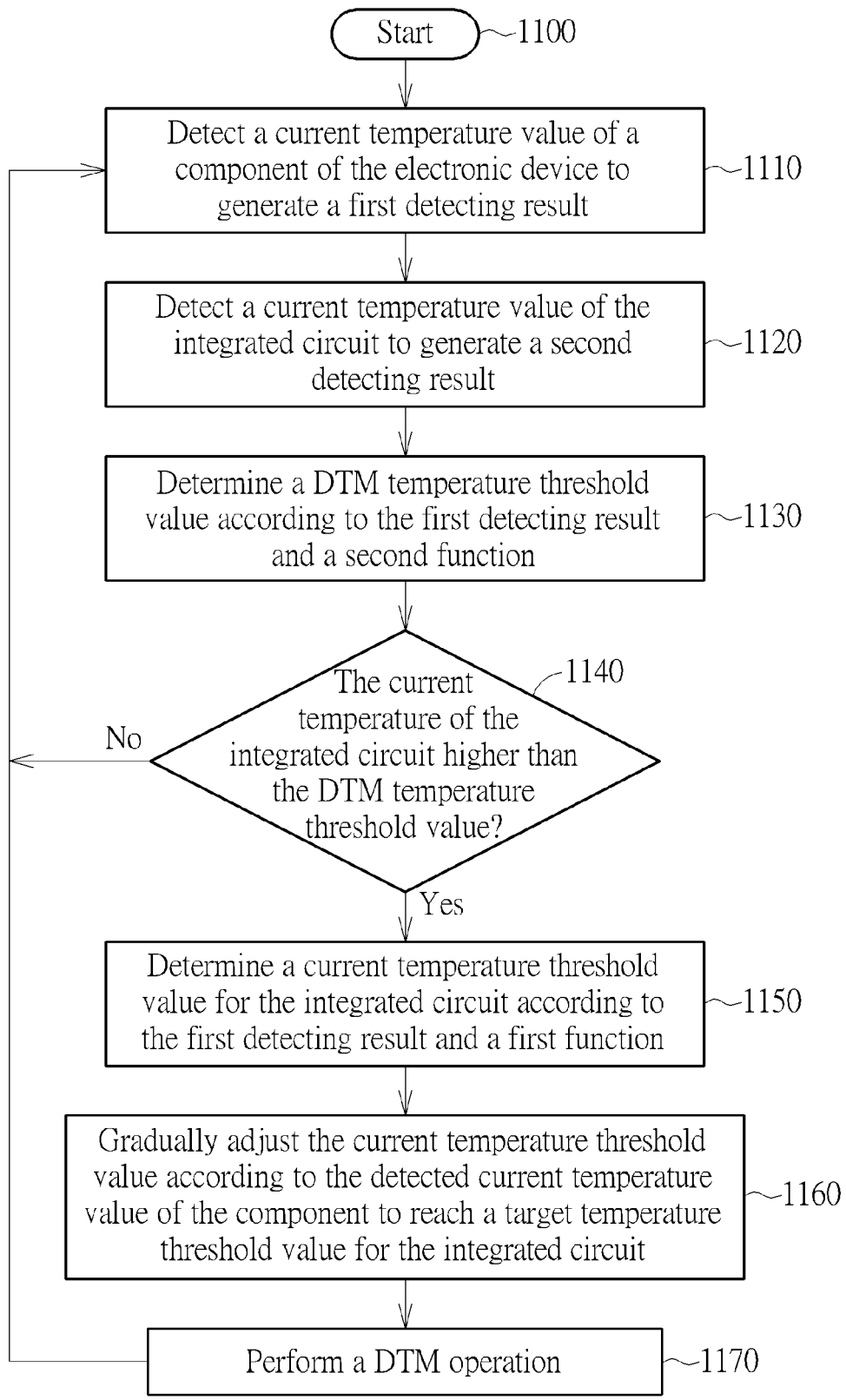
FIG. 15 is another flowchart showing a thermal control method in accordance with the operation schemes of the thermal control system in FIG. 10.

FIG. 15 is another flowchart showing a thermal control method in accordance with the operation schemes of the thermal control system 900 of the third embodiment in FIG. 10. Provided that the result is substantially the same, the steps in FIG. 15 are not required to be executed in the exact order shown in FIG. 15. The thermal control method in accordance with the above embodiment of the thermal control system 900 in the invention comprises the following steps:

Step 1100: Start.

Step 1110: Detect a current temperature value of a component of the electronic device to generate a first detecting result.

Step 1120: Detect a current temperature value of the integrated circuit to generate a second detecting result.

Step 1130: Determine a DTM temperature threshold value according to the first detecting result and a second function.

Step 1140: Compare the current temperature of the integrated circuit with the DTM temperature threshold value; if the current temperature of the integrated circuit is higher than the DTM temperature threshold value, then go to the Step 1150; and if the current temperature of the integrated circuit is not higher than the DTM temperature threshold value, then go to the Step 1110 (or exit a DTM operation).

Step 1150: Determine a current temperature threshold value for the integrated circuit according to the first detecting result and a first function.

Step 1160: Gradually adjust the current temperature threshold value according to the detected current temperature value of the component to reach a target temperature threshold value for the integrated circuit.

Step 1170: Perform a DTM operation.

In addition, the above thermal control method can further comprise a step of loading a firmware comprising parameters of the first function before performing the Step 1110.

The thermal control method and the thermal control system disclosed by the invention can provide a better user experience for smooth application performance, and the invention can better fit environmental changes and have a better dynamic thermal management.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A thermal control method for an integrated circuit in an electronic device, comprising:
   detecting a current temperature value of a component of the electronic device to generate a first detecting result;
   determining a current temperature threshold value for the integrated circuit according to the first detecting result and a first function; and
   gradually adjusting the current temperature threshold value according to the detected current temperature value of the component to reach a target temperature threshold value for the integrated circuit.

2. The thermal control method of claim 1, further comprising:
   detecting a current temperature value of the integrated circuit to generate a second detecting result; and
   determining whether to enter/exit a dynamic thermal management (DTM) operation according to the first detecting result and the second detecting result.

3. The thermal control method of claim 2, wherein the step of determining whether to enter/exit the DTM operation according to the detecting result comprises:
   determining a DTM temperature threshold value according to the first detecting result and a second function;
   comparing the current temperature of the integrated circuit with the DTM temperature threshold value;
   if the current temperature of the integrated circuit is higher than the DTM temperature threshold value, then entering the DTM operation; and
   if the calculating result is not higher than the DTM temperature threshold value, then exiting the DTM operation.

4. The thermal control method of claim 3, further comprising:
   loading a firmware comprising parameters of the first function and the second function.

5. The thermal control method of claim 3, wherein the first function and the second function are continuous functions.

6. The thermal control method of claim 1, further comprising:
   continuously detecting a current temperature value of the integrated circuit to generate a second detecting result;
   determining whether to enter/exit a dynamic thermal management (DTM) operation according to the first detecting result and the second detecting result after determining the current temperature threshold value for the integrated circuit according to the detecting result.

7. The thermal control method of claim 6, wherein the step of determining whether to enter/exit the DTM operation according to the detecting result comprises:
   determining a DTM temperature threshold value according to the first detecting result and a second function;
   comparing the current temperature of the integrated circuit with the DTM temperature threshold value;
   if the current temperature of the integrated circuit is higher than the DTM temperature threshold value, then entering the DTM operation; and
   if the calculating result is not higher than the DTM temperature threshold value, then exiting the DTM operation.

8. The thermal control method of claim 7, further comprising:
   loading a firmware comprising parameters of the first function and the second function.

9. The thermal control method of claim 7, wherein the first function and the second function are continuous functions.

10. The thermal control method of claim 1, wherein the first function is a continuous function.

11. A thermal control system for an integrated circuit in an electronic device, comprising:
   a first detecting unit, for detecting a current temperature value of a component of the electronic device to generate a first detecting result; and
   a determining unit, coupled to the first detecting unit, for determining a current temperature threshold value for the integrated circuit according to the first detecting result and a first function, and gradually adjusting the current temperature threshold value according to the detected current temperature value of the component to reach a target temperature threshold value for the integrated circuit.

12. The thermal control system of claim 11, further comprising:
   a second detecting unit, for continuously detecting a current temperature value of the integrated circuit to generate a second detecting result;

wherein the determining unit further determines whether to enter/exit a dynamic thermal management (DTM) operation according to the first detecting result and the second detecting result.

13. The thermal control system of claim 12, wherein the function of the determining unit of determining whether to enter/exit the DTM operation according to the detecting result comprises:
   determining a DTM temperature threshold value according to the first detecting result and a second function;
   comparing the current temperature of the integrated circuit with the DTM temperature threshold value;
   if the current temperature of the integrated circuit is higher than the DTM temperature threshold value, then entering the DTM operation; and
   if the calculating result is not higher than the DTM temperature threshold value, then exiting the DTM operation.

14. The thermal control system of claim 13, wherein the determining unit further comprises a function of loading a firmware comprising parameters of the first function and the second function.

15. The thermal control system of claim 13, wherein the first function and the second function are continuous functions.

16. The thermal control system of claim 11, further comprising:
   a second detecting unit, for continuously detecting a current temperature value of the integrated circuit to generate a second detecting result;
   wherein the determining unit further determines whether to enter/exit a dynamic thermal management (DTM) operation according to the first detecting result and the second detecting result after determining the current temperature threshold value for the integrated circuit according to the first detecting result.

17. The thermal control system of claim 16, wherein the function of the determining unit of determining whether to enter/exit the DTM operation according to the detecting result comprises:
   determining a DTM temperature threshold value according to the first detecting result and a second function;
   comparing the current temperature of the integrated circuit with the DTM temperature threshold value;
   if the current temperature of the integrated circuit is higher than the DTM temperature threshold value, then entering the DTM operation; and
   if the calculating result is not higher than the DTM temperature threshold value, then exiting the DTM operation.

18. The thermal control system of claim 17, wherein the determining unit further comprises a function of loading a firmware comprising parameters of the first function and the second function.

19. The thermal control system of claim 17, wherein the first function and the second function are continuous functions.

20. The thermal control system of claim 11, wherein the first function is a continuous function.

21. The thermal control system of claim 11, wherein the electronic device is a cellphone.

22. The thermal control system of claim 11, wherein the component is a printed circuit board (PCB) of the cellphone.

23. The thermal control system of claim 11, wherein the integrated circuit is a system on chip (SoC) of the cellphone.

* * * * *